Nov. 22, 1932. A. J. WEATHERHEAD, JR 1,888,338

COUPLING

Filed June 13, 1930

INVENTOR
A. J. WEATHERHEAD, JR.

BY Fisher, Moser & Moore

ATTORNEY

Patented Nov. 22, 1932

1,888,338

UNITED STATES PATENT OFFICE

ALBERT J. WEATHERHEAD, JR., OF CLEVELAND, OHIO

COUPLING

Application filed June 13, 1930. Serial No. 460,837.

The present invention relates to couplings, and more particularly to a combined hose and flared tube coupling. Thus, the object of the invention in general is to provide a coupling device embodying an independent replaceable sealing member adapted to permit a flexible hose and a flared copper tube to be connected together in a simple and facile way and with fluid-tight sealing effect. As constructed, the device includes a coupling body adapted to be attached to a frame, wall or other support with the hose and tube extending in opposite directions therefrom, and this body is provided with an internal seat for the flared end of the tube. The sealing member is in the form of a disk or washer against which the end of the hose is adapted to abut and whereby the sealing member itself may be pressed tightly against the flared end of the tube and said flared end pressed tightly to its seat in the coupling body thus effectually sealing all the joints between the hose and tube and said body by merely attaching the hose to the body, all as hereinafter shown and described and more particularly pointed out in the claim.

Figure 1:
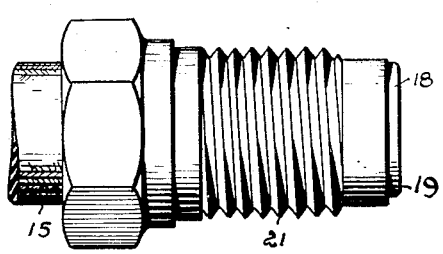
Figure 2:
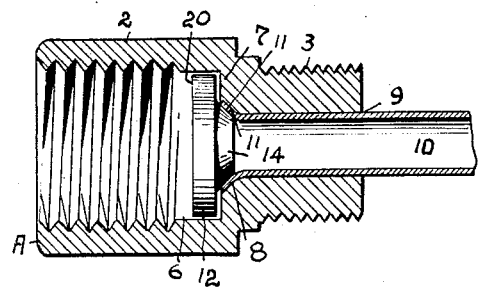
Figure 3:
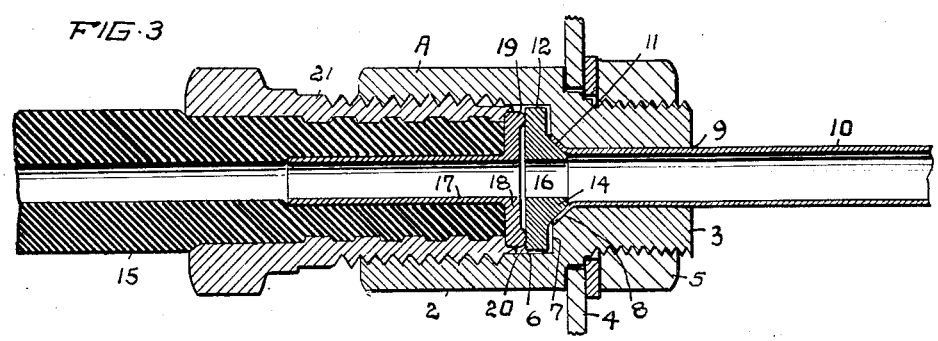
Figure 4:
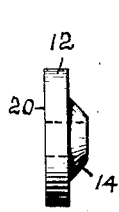
Figure 5:
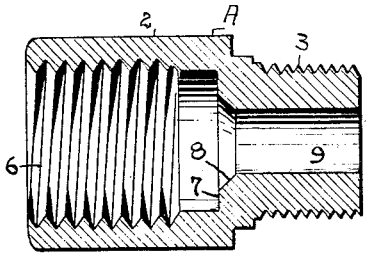
Figure 6:
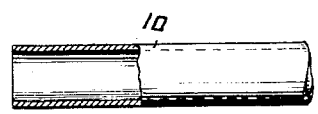
Figure 7:
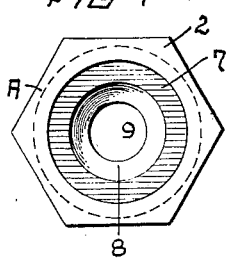
Figure 8:
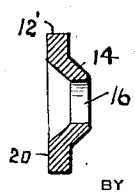

In the accompanying drawing, Fig. 1 is a side elevation of a hose having a screw-threaded attachment thimble or nut affixed to the end thereof, and Fig. 2 is a sectional view of a coupling body and a flared tube assembled and showing a sealing member in elevation therein. Fig. 3 is a sectional view of the complete coupling, with a hose and flared tube connected together. Fig. 4 is a side elevation of the sealing member, Fig. 5 a sectional view of the coupling body, and Fig. 6 is a sectional and side view of a piece of pipe before it is flanged or flared. Fig. 7 is an end view of the coupling body, and Fig. 8 is a sectional view of a modified form of sealing member.

The coupling comprises a cylindrical body A having a hexagonal enlargement 2 for wrench engagement. As shown this body is formed with a screw-threaded extension 3 of reduced diameter at one end to permit the body to be attached to a supporting member 4 by a nut 5. Body A includes a relatively large screw-threaded recess or cavity 6 having a substantially flat annular bottom 7 with a central tapering opening and seat 8, and the reduced extension 3 on body A is formed with a smoothly-finished axial bore or passage 9 terminating at said opening and seat 8. A relatively small tube 10 of soft metal, such as copper is introduced into the smooth bore 9 and flared at its end to conform to the tapering seat 8, thereby permitting such a tube to be connected rigidly to body A by merely clamping the flared end 11 of the tube against seat 8. To effect that result and also to obtain a fluid-tight joint for the tube, a flat sealing disk or washer 12 having a conical protuberance 14 at its center and shaped to conform to the tapering seat 8 is introduced into the large cavity 6 and caused to press against the flared end 11 of the copper tube when a relatively large flexible hose or pipe 15 is connected to coupling body A. Preferably, disk 12 is made of brass or non-corrodible metal, and contains a central opening 16 which passes through the truncated end of the tapering protuberance or cone 14 on the disk. The hose or pipe 15, in the present instance, is also provided with a nipple 17 having an end flange 18 with an annularly beaded edge portion 19 adapted to abut or bear against the flat face 20 of sealing disk 12 when the hose is introduced into the cavity and screwed to the bottom thereof by a screw-nut or thimble 21 affixed or sleeved upon the hose. Thus by merely screwing the hose to coupling body A the joint between the end of the hose and the flat face of disk 12 is tightly closed and sealed, and the joint between the cone 14 and the flared end 11 of the copper tube also sealed, and furthermore, the flared end 11 of the tube is clamped tightly within and to the coupling body. The coupling body may be made of solid rod stock, say steel, by screw-machine operations, and the sealing disk may be made in the same manner from rod stock, or the disk may be pressed from flat sheet stock, say brass (see disk 12', Fig. 8) thus permitting the coupling to be produced simply and rapidly at a low cost.

What I claim, is:

A coupling for a hose and small tube comprising a body having a screw-threaded extension and an enlarged screw-threaded cavity closed by a straight wall, a passage in the central area of said wall extending through said extension, a conically recessed seat encircling the inside end of said passage, and an independent sealing disk of narrow width provided at one side with a conical protuberance adapted to be tightly seated upon said conically recessed seat and to force the flared end of a pipe, extended through said passage, into sealing engagement with said seat, said disk having a flat surface at its other side adapted to engage with and seal the end portion of a hose secured into said body.

In testimony whereof I affix my signature.

ALBERT J. WEATHERHEAD, Jr.